(12) United States Patent
Treiber et al.

(10) Patent No.: US 7,043,539 B1
(45) Date of Patent: May 9, 2006

(54) GENERATING A DESCRIPTION OF A CONFIGURATION FOR A VIRTUAL NETWORK SYSTEM

(75) Inventors: Ted Treiber, Fremont, CA (US); Troy Ziegler, Redwood City, CA (US)

(73) Assignee: Terraspring, Inc., Fremont, CA (US)

( * ) Notice: Subject to any disclaimer, the term of this patent is extended or adjusted under 35 U.S.C. 154(b) by 705 days.

(21) Appl. No.: 10/113,845

(22) Filed: Mar. 29, 2002

(51) Int. Cl.
*G06F 15/177* (2006.01)

(52) U.S. Cl. .................. 709/220; 709/221; 709/226; 711/100; 711/166; 711/170

(58) Field of Classification Search .............. 709/220

See application file for complete search history.

(56) References Cited

U.S. PATENT DOCUMENTS

| | | | |
|---|---|---|---|
| 5,991,759 A * | 11/1999 | Knoblock et al. | 707/10 |
| 6,434,619 B1 * | 8/2002 | Lim et al. | 709/229 |
| 6,597,956 B1 * | 7/2003 | Aziz et al. | 700/3 |
| 6,691,165 B1 * | 2/2004 | Bruck et al. | 709/227 |
| 2002/0073181 A1 * | 6/2002 | Christensen | |

OTHER PUBLICATIONS

Siebel eConfigurator Datasheet; ©1990-2001 Siebel Systems, Inc.; World Headquarters, 2207 Bridgepointe Parkway, San Mateo, CA 94404; Control No. 10P10-DS880-05620 (Sep. 2001).

* cited by examiner

*Primary Examiner*—Zarni Maung
*Assistant Examiner*—Glenford Madamba
(74) *Attorney, Agent, or Firm*—Hickman Palermo Truong & Becker, LLP

(57) ABSTRACT

A method and apparatus for generating a description of a configuration of a network that includes a plurality of devices is disclosed. Input is received that specifies the resource devices for the network. The input values are processed with a set of data according to one or more rules to determine the plurality of devices for the network, which includes one or more control devices and may include a set of storage equipment. The plurality of devices is determined without using a set of predetermined descriptions for the devices to be included in the network. An additional value that changes one or more of the input values is received, and in response to the receipt of the additional value, the plurality of devices for the network is modified. The modification is made without requiring additional input. Based on the modified plurality of devices, the description of the network is generated.

26 Claims, 4 Drawing Sheets

GENERATING A DESCRIPTION OF A CONFIGURATION FOR A VIRTUAL NETWORK SYSTEM

FIELD OF THE INVENTION

The present invention generally relates to processes and systems for configuring computer networks, and more specifically, to generating a description of a configuration for a virtual network system.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, increasingly large and more complex networks are being created and used to provide services for companies worldwide. Such networks may consist of many devices that are linked together by numerous connections, and a large variety of types of network devices may be used. For example, the types of network devices include, but are not limited to, switches, routers, bridges, central processing units (CPU's), storage devices, terminal servers, load balancers, firewalls, external hubs, or any other device that may be incorporated into a network. A network may organize and arrange the devices and other equipment in one or more densely packed equipment racks.

There may be differences among types of network devices depending on other factors, such as the specific role for a particular network device or the identity of the manufacturer of the network device. A large variety of types of connections between network devices are available, such as serial connections, various forms of Ethernet, and fiber connections. All of the variations in network devices, functions performed by the network devices, differences among manufacturers, and variations in interconnections result in highly differentiated and complex networks.

One challenge arising from such networks is how to configure a network with the right number of each type of device and other equipment so that the network configuration satisfies a set of requirements. For example, the owner of a network may desire that the network have a specified set of devices, such as a particular number of servers, load balancers, and firewalls and a particular storage capacity. Additional requirements may include the cost of the network, the amount of power required to run all the network equipment, and the amount of floor space required for the network.

A "server farm" is one example of such a network in which servers and other network devices are made available for use by a variety of other clients or companies. Some server farms are implemented using a wide scale computing fabric ("computing grid"). The computing grid can be physically constructed once, and then logically divided up for various organizations on demand. A part of the computing grid is allocated to each of a plurality of enterprises or organizations. Each organization's logical portion of the computing grid is a "virtual network system," which is sometimes referred to as a Virtual Server Farm (VSF). Each organization retains independent administrative control of its VSF. Each VSF can change dynamically in terms of number of CPUs, storage capacity and disk and network bandwidth based on real-time demands placed on the server farm or other factors. Each VSF is secure from every other organization's VSF, even though they are all logically created out of the same physical computing grid. A VSF can be connected back to an Intranet using either a private leased line or a Virtual Private Network (VPN), without exposing the Intranet to other organizations' VSFs.

One approach for configuring a network is to use a planning tool that is based on a decision tree to select from available options to identify an acceptable configuration or design. FIG. 1 is a logical block diagram that depicts a decision tree 100 that includes a set of decision blocks 104 and a set of design blocks 108. A user works through each level of the set of decision blocks 104, selecting one of the available options at each decision block, to reach an acceptable design block from the set of design blocks 108.

For example, assume that a user begins in decision block 110 that asks how many database (DB) servers are desired for the network. The available choices are "TWO" or "FOUR" DB servers as depicted in FIG. 1. The user selects "TWO," which leads to decision block 120. The user then selects the Windows operating system (OS) at decision block 120, which leads to decision block 142, where the user selects the number of storage devices. If the user wants only one storage device, the designer arrives at design block 164, which specifies a network design having two DB servers, the Windows OS, and one storage device.

However, the decision tree based approach has several drawbacks. For example, if the user later decides to use the Solaris OS instead of Windows, the user must backtrack in decision tree 100 to decision block 120 to change the OS selection from Windows to Solaris, and then navigate through decision block 140 to reach design block 160 (assuming the number of storage devices is unchanged). If the user wanted to change the number of DB servers, the user would have to backtrack in decision tree 100 even further and then navigate through the same choices, although in different decision blocks, to reach a new design block from the set of design blocks 108. For larger, complex networks, the number of decision blocks and design blocks can be very large, involving dozens of decisions and hundreds of possible designs, which makes changing prior decisions very inconvenient and time consuming.

Another problem with the decision tree based approach is that the decision blocks and design blocks are predetermined. In decision tree 100, each decision block in the set of decision blocks 104 and each design block in the set of design blocks 108 are established when decision tree 100 is created. For example, in decision block 110, only two options are provided for the number of DB servers, one or two. In practice, the decision block may allow for many possible values (e.g., the number of DB servers or a storage capacity for the network), and therefore the decision tree can provide a branch for each possible value or at least a reasonable set of possible values. For example, in decision block 110, the network designer could enter the number of DB servers desired, which would be implemented in decision tree 100 as a different branch for each possible value. If decision tree 100 accommodates any integer from one to twenty, then there would be twenty branches leading from decision block 110, and for each branch, a decision block would be included for choosing the OS.

Unfortunately, allowing for a broad selection of options at each design block greatly increases the complexity of a decision tree, and the more complex the decision tree becomes, the more difficult it is for an administrator to maintain decision tree and the more difficult it is for a user to navigate and backtrack when necessary through the decision tree. Furthermore, not only is the user limited to selecting from the options presented at each decision block, ultimately the user is limited to selecting a design from those represented in the set of design blocks, which again must be chosen to balance the need for a wide selection of possible designs yet control the complexity of the decision tree.

Based on the foregoing, it is desirable to provide improved techniques for generating a description of a configuration for a network.

SUMMARY OF THE INVENTION

Techniques are provided for generating a description of a configuration for a virtual network system. According to one aspect, input values are received that specify the resource devices to be included in the network, such as the number of firewalls, load balancers, and servers. In response to receiving the input, the input values are processed with a set of data according to one or more rules to determine the devices to be included in the network. The set of data includes information about one or more characteristics of each type of device to be included in the network. The devices to be included in the network include the resource devices, one or more devices for controlling the network, and optionally the storage devices to be included in the network. An additional value is received that changes one or more of the previously received input values. In response to receiving the additional value, the input values and the additional value are processed with the set of data according to the one or more rules to modify the devices to be included in the network. Based on the devices to be included as modified, the description of the network is generated.

According to other aspects, the devices to be included in the network is determined without using predetermined descriptions of possible sets of devices to be included in the network. The plurality of devices is modified without requiring additional input beyond the additional input value that is provided. The input values specify one or more storage options for the network and one or more options for terminal server connectivity. The devices that are determined to be included in the network include one or more terminal servers and a set of switching equipment. The description of the configuration of the network includes an estimate of a set of equipment for the network, which may in turn include a bill of materials for the network. The description of the configuration of the network may include one or more of the following additional types of information: the power requirements of the network, the floor space requirements of the network, the number of equipment racks for the network, and the cost of the network.

According to yet other aspects, the devices to be included in the network are determined based on a configuration of an equipment rack. The configuration specifies how many devices of one or more device types can be housed in an equipment rack, and based on the configuration, the number of equipment racks required for the network is estimated. The input values may specify the number of software licenses for the network, such as for the one or more types of operating systems, and a check may be made to ensure that the number of software licenses satisfies a criterion, such as that there is at least one software license for each server in the network. The network may be a server farm, and the server farm may include one or more virtual server farms.

According to other aspects, the invention encompasses a computer-readable medium, a carrier wave, an apparatus, and a system configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF THE INVENTION

Figure 1:
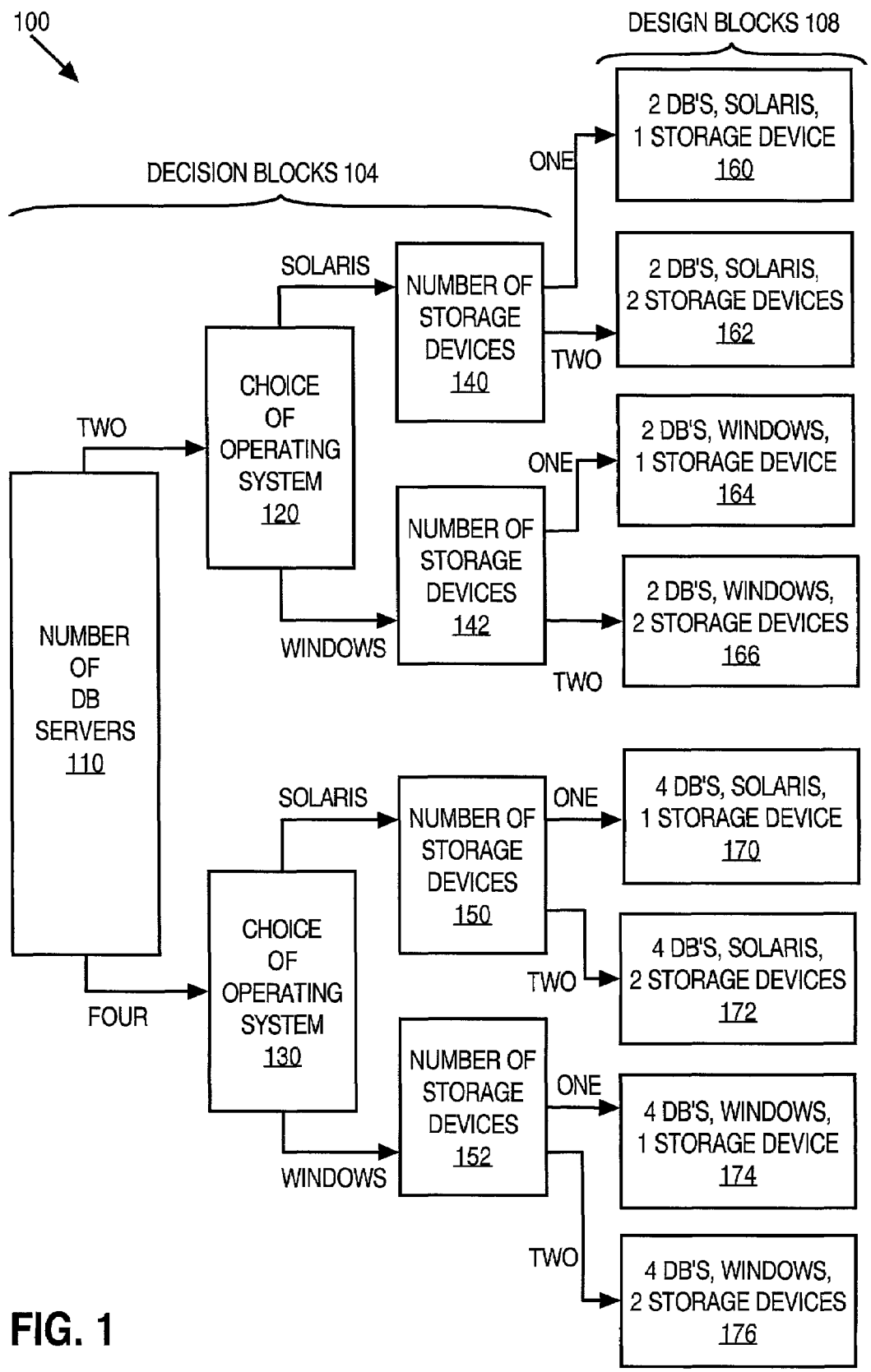
FIG. 1 is a logical block diagram that depicts a decision tree that includes a set of decision blocks and a set of design blocks.

A method and apparatus for generating a description of a configuration for a virtual network system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. Functional and Structural Overview
   A. Introduction and Terminology
   B. Function Overview
   C. Structural Overview
II. Description of Inputs
   A. Resource Devices
   B. Storage Options
   C. Terminal Server Connectivity
   D. Software Licenses
   E. Other Inputs
III. Determination of Network Equipment Requirements
   A. Storage Devices
   B. Control Devices
   C. Equipment Racks
   D. Rack Configuration Templates
   E. Description of Network Configuration
IV. Determination of Additional Network Parameters and Information
   A. Power Requirements
   B. Floor Space Requirements
   C. Bill of Materials
   D. Cost
   E. Other Parameters
V. Implementation Mechanisms
VI. Extensions and Alternatives

I. Functional and Structural Overview

A. Introduction and Terminology

Techniques are provided for generating a description of a configuration for a virtual network system. According to one embodiment, a description of a configuration for a network that includes a plurality of devices is generated based on input values, additional data, and one or more rules. For example, a user may provide input values that describe the resource devices to be included in the network. In response to receiving the input, the input is processed along with other data and one or more rules to determine the devices and other equipment to be included in the network, including one or more control devices. An additional input value is received that changes one or more values previously received, and the revised input is processed to modify the devices and other equipment to be included in the network. Based on the devices and other equipment determined in response to receiving the additional input value, a description of the network is generated.

The description of the network configuration may include a listing of all equipment to be included in the network. In addition, the description may include estimates of one or more of the following types of parameters or information: a bill of materials (BOM), the number of Fast Ethernet and Gigabit Ethernet ports required by the network, the number of equipment racks required to house the network devices and equipment, the floor space required for the network, the total power required by the network, and the cost of the network.

As used herein, the term "resource devices" is used to refer to devices that provide a capability or capacity for the network, such as servers, firewalls, load balancers, and storage devices. Examples of servers include, but are not limited to, database servers that are used to access one or more databases, Web servers that provide information to clients via the World Wide Web over the Internet, or any other type of server that provides a service or function to another computing device in a client-server relationship. As used herein, the term "resource layer equipment" includes resource devices and other devices, components, and equipment that provide resources to the network.

As used herein, the term "control devices" refers to devices that are used to control the network and perform administrative functions. Examples of control layer equipment include central processing units (CPU's) that perform administrative and control functions for the network, routers, switches, including both core switches and access switches, and terminal servers. As used herein, the term "control layer equipment" includes control devices and other devices, components, and equipment that are used for control functions for the network.

As used herein, the term "storage devices" refers to devices that provide persistent storage for the network. Examples of storage devices include, but are not limited to, front-end storage area networks (SAN's) for interfacing with the network storage devices, disks or disk arrays for the storage function, back-end SAN's for backup purposes, and tape libraries. As discussed above, storage devices are an example of resource devices.

As used herein, the term "network" refers broadly to two or more interconnected devices. Examples of networks include, but are not limited to, local area networks (LANs), wide area networks (WANs), the Internet, and server farms. A "server farm" is an example of a network provided by an outsourcing facility in which servers and other network devices are made available for use by a variety of other clients or companies.

B. Functional Overview

Figure 2:
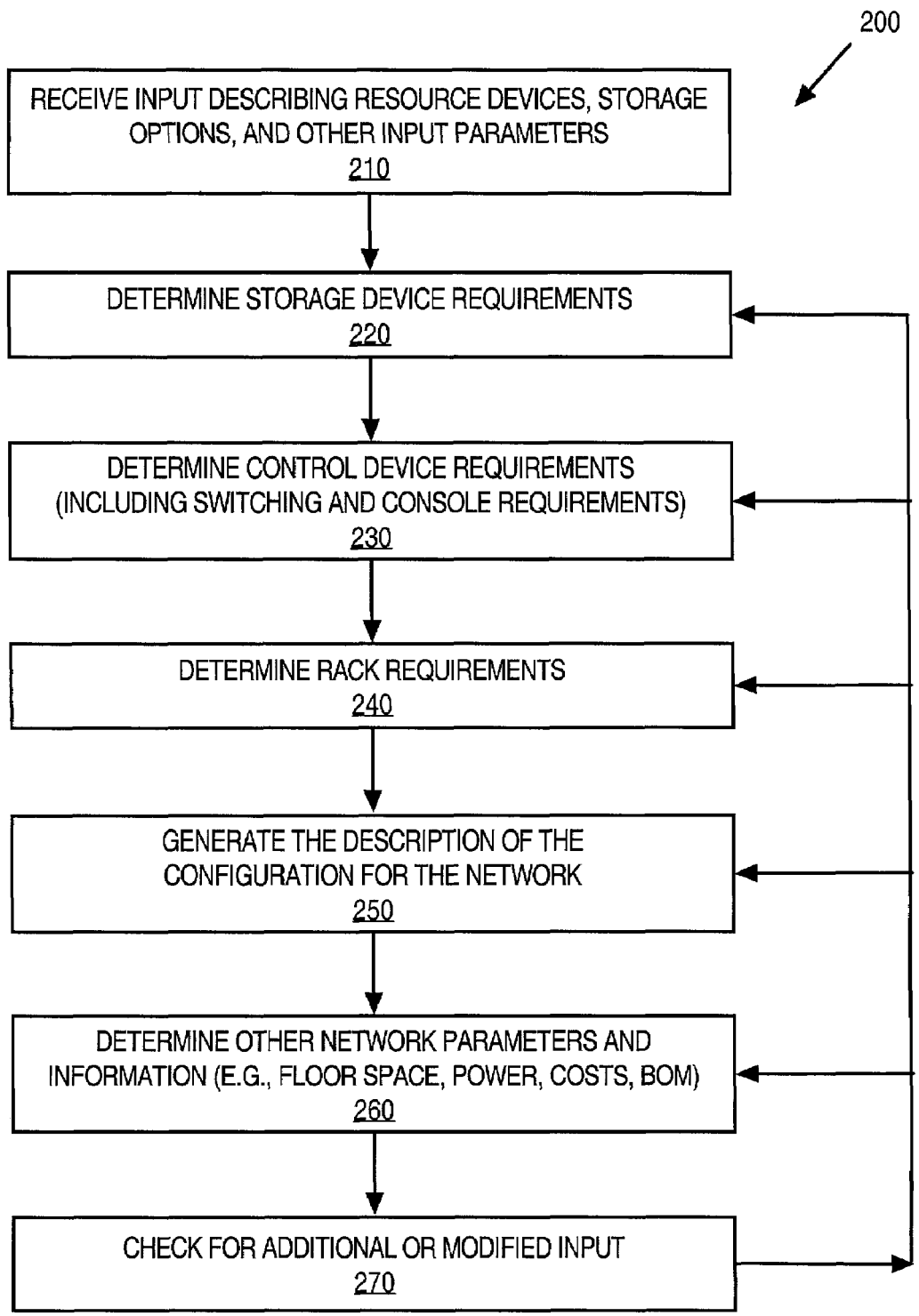
FIG. 2 is a flow diagram that depicts a high level overview of an approach for generating a description of a configuration for a virtual network system, according to one embodiment.

FIG. 2 is a flow diagram 200 that depicts a high level overview of an approach for generating a description of a configuration for a virtual network system, according to one embodiment. While FIG. 2 depicts a particular series of steps in a particular order, steps may be added or omitted and the order changed from that of FIG. 2.

In block 210, input describing the resource devices, storage options, and other parameters for the network is received. The input is typically in the form of a set of user provided values that describe one or more characteristics of the network resources. For example, the values may specify the number of resource devices desired for the network by device type (e.g., the number of firewalls and load balancers) or a particular device (e.g., the number of Sun 420R 2×2, Sun 420R 4×4, and HP LPr NetServer servers). The values may specify the number of storage devices desired of various storage device types or a total amount of storage capacity for the network, along with other storage options such as backup capabilities. In addition, the input values may specify the terminal server connectivity desired for control devices, servers, and other network devices.

In block 220, the storage device requirements for the network are determined. The storage device requirements may include not only the number of storage devices specified, but also any other SAN equipment to be included in the network, such as the number of SAN switches required to support the requested storage devices. The number of SAN switches may be determined based upon the storage devices specified in block 210 along with data that describes the storage devices, such as the number of data ports required for each device, and one or more rules, such as that 12 ports of each SAN switch can be used for data.

In block 230, the control device requirements are determined. For example, the values received in block 210 may specify whether the network is to have a highly available infrastructure, and if so, a rule may specify that two infrastructure database (IDB) devices may be included in the network instead of just one IDB.

Other control devices include the number of switches for the network and the number of blades per switch to provide a sufficient number of ports for the network. For example, based on the resource devices, storage devices, and control devices, the network may require a particular number of Gigabit and Fast Ethernet ports. A rule for configuring the network may specify the number of switches to be used, and data may specify the number of each type of port required or supplied by each device (e.g., the number of ports of each Ethernet type per blade). Based on this information, the number of blades for the switches can be determined to supply a sufficient number of ports for the devices of the network.

Other control devices include the terminal servers required for the network to provide the requested degree of terminal server connectivity. For example, the values received in block 210 may specify whether terminal server connectivity is desired for different types of devices. Data may be retrieved for each device type that indicates the number of terminal server connections required or provided by each device for each device type or device model. Based on this information, the number of terminal servers required for the network are determined.

After the control device requirements are determined in block 230, the rack requirements are determined in block 240. For networks having more than a few devices, equipment racks are used to house, organize, and support the devices in the network. Based on the resource devices, storage devices, and control devices specified or determined in blocks 210, 220, and 230, the number of racks required to house all of the devices is determined using data for each type of equipment, such as the size and shape of each device. One or more rules can be applied to determine the number of racks, such as that only a specified maximum number of a particular device type are to be included in each rack. Additional input values may be used, such as the number of extra racks desired for the network to accommodate equipment to be added in the future. Additional data may be used, such as that a particular number of certain types of racks are to be included in each network, such as that each network is to include a control rack, a core rack, and a gateway/backup rack.

According to one embodiment, a "rack template" is used to determine the number of racks. The rack template specifies the maximum number of devices of one or more types to be included in a particular rack configuration. For example, a particular rack template may specify that no more than two firewalls, two load balancers, two Sun 420R servers, and 10 HP LPr NetServers are to be included in each equipment rack. Based on the rack template and the number of each type of device to be included in the network, the number of racks is determined. Use of rack templates helps ensure that a particular combination of equipment will actually fit in a designated number of racks.

In block 250, the description of the configuration for the network is generated. The description of the configuration for the network may include a description of the equipment requirements for the network, including but not limited to, the resource devices specified in the input values from block 210, the storage devices determined in block 220, the control devices determined in block 230, the racks determined in block 240, and any other equipment required for the network. The other equipment may include, but is not limited to, support equipment for the other devices and cabling.

In block 260, other network parameters and information are determined. For example, the floor space required by the network may be determined based on the number of equipment racks, and data that specifies the amount of floor space per rack, according to a rule that includes allowance for spacing between the racks. As another example, the total power requirements for the network may be estimated based on equipment power data for each type of equipment, and a rule that takes into account the power losses in the cabling and equipment. As other examples, the total cost for the network may be determined based on pricing data for each type of device and other equipment required for the network, and a bill of materials (BOM) may be generated based on the description of the configuration of the network.

In block 270, a check for additional or modified input is performed. For example, after the input is received in block 210 and one or more of the functions described above with respect to blocks 220 through 260 are performed, additional input may be received that adds a value to the set of values received in block 210 or changes a previously supplied value. For example, after reviewing the total estimated cost for the network, the user may reduce the number of servers to reduce the cost.

From block 270, the approach automatically returns to one or more of blocks 220 through 260 to revise the determinations and information generated before in blocks 220, 230, and 240, thereby modifying the description of the configuration of the network generated in block 250 and revising any affected parameters or other information as determined in block 260.

After taking into account any new or revised input values received in block 270, additional checks are performed in block 270 for further input additions or revisions. Because the approach automatically returns to one or more of blocks 220 through 260 as necessary, only the additional or modified input values need be supplied for receipt in block 270. Unchanged values from block 210 need not be provided and received after the additional or modified input received in block 270.

C. Structural Overview

Figure 3:
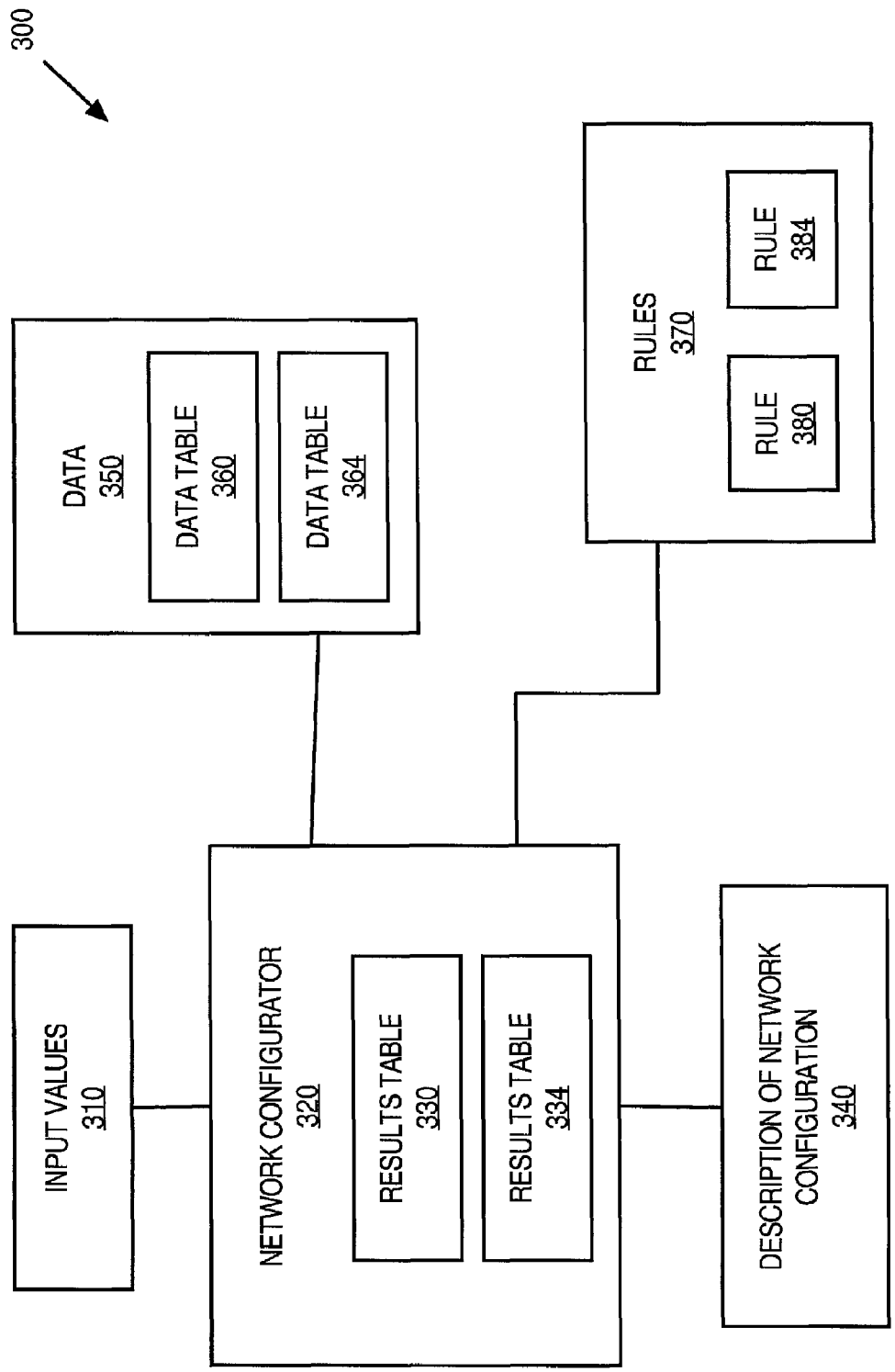
FIG. 3 is a block diagram that depicts a high level overview of a system for generating a description of a configuration for a virtual network system, according to an embodiment.

FIG. 3 is a block diagram 300 that depicts a high level overview of a system for generating a description of a configuration for a virtual network system, according to an embodiment. For convenience of explanation, FIG. 3 is described with reference to the approach of FIG. 2. While the following description is discussed in terms of the features of the embodiment depicted in FIG. 2 and FIG. 3, other embodiments may contain fewer or more features than those of FIG. 2 and FIG. 3, and the features of a particular embodiment may be combined, distributed, or arranged in a manner different than that depicted in FIG. 2 and FIG. 3.

FIG. 3 depicts input values 310, a network configurator 320, and a description of network configuration 340. Input values 310 represents the plurality of values that are received in block 210 of FIG. 2. Description of network configuration 340 is the result of block 250 of FIG. 2, and optionally may include the other network information and parameters as determined in block 260 of FIG. 2. Network configurator 320 performs the steps of determining the storage device requirements of block 220 of FIG. 2, determining the control device requirements of block 230, determining the rack requirements of block 240, generating the description of the network of block 250, determining the other network parameters and information of block 260, and checking for additional or modified input of block 270. In one embodiment, network configurator 320 is implemented as a multi-sheet Excel spreadsheet, such as an Excel workbook.

Network configurator 320 includes results tables 330, 334 that may be used to store results of one or more steps while generating the description of the network configuration. For example, results table 330 may hold the storage device requirements that are determined in block 220 of FIG. 2, and results table 334 may hold the control device requirements that are determined in block 230 of FIG. 2. While network configurator 320 is depicted as including two results tables 330, 334, any number of results tables may be included. Furthermore, each results table may store any data, parameters, or other information, including but not limited to, intermediate results of any of the steps depicted in FIG. 2 (e.g., a results table may be used to summarize switching equipment requirements or to describe terminal server connectivity). Network configurator 320 may be implemented in many ways, including but not limited to, as a stand along software or hardware application, a programming module or subroutine, or a spreadsheet.

In addition, FIG. 3 depicts data 350 that includes data that is not provided as part of input values 310, but is used in generating description of network configuration 340. Data 350 includes data tables 360, 364 that include information on one or more device types or models, various types of parameters, or any other information that can be used to generate information about the network. For example, data table 360 may include data on the number of Gigabit Ethernet ports and Fast Ethernet ports required by and provided by each device type and device model. As another example, data table 364 may include the power requirements and costs for each type and model of equipment to be included in the network. While data 350 is depicted with two data tables, any number of data tables may be used and organized as appropriate for a particular implementation. Data 350 may be implemented in many ways, including but not limited to, as a separate database, a data table, or one or more files containing the data.

Data 350 may specify a base configuration for the network, such as the number, arrangement, and configuration of particular devices. For example, the base configuration may specify the use of two core switches and two access switches along with supporting equipment, and that each switch is configured with a base number of Gigabit and Fast Ethernet ports. Therefore, input values 310 customize the base configuration and add additional resources, such as the number of certain types of servers and the amount of storage capacity for the network, but input values 310 generally do not make significant changes to the base configuration of the network infrastructure.

FIG. 3 also depicts rules 370 that includes a set of rules for use in generating the description of the network configuration, such as rules 380, 384. For example, rule 380 may specify that power requirements are to be adjusted to reflect the efficiency of the equipment and cabling (e.g., a power loss factor). As another example, rule 384 may specify that each SAN switch can support twelve ports for use with the storage devices. Rules 370 may be implemented in many ways, including but not limited to, a separate listing of rules, a database of rules, or a collection of formulas, such as in a spreadsheet, or other logical constructs that determine how one or more source data values are used to determine one or more result values.

While network configurator 320, data 350, and rules 370 are depicted in FIG. 3 as separate logical blocks, any or all of them may be combined or further separated. For example, network configurator 320 may include the information included in data 350 and the logic embodied in rules 370, such as in an implementation in which network configurator 320 is a spreadsheet organized as a workbook with multiple pages. The logic of rules 370 may be embodied in the formulas of the cells of the workbook, and the information of data tables 360, 364 may be included in separate pages of the workbook or even in the formulas of the spreadsheet cells. As another example, network configurator 320 may be broken up into separate application modules that each perform a particular type of operation or step, such as having a different module to perform each function depicted in the blocks of FIG. 2. One or more of the application modules may include the use of a graphical user interface for receiving the input values and providing the description of the network configuration. Any of the foregoing may be implemented as one or more programs, processes, data representations, or other software elements.

II. Description of Inputs

According to one embodiment, a plurality of values is received that describe one or more inputs for determining a description of the configuration of a network that includes a plurality of devices. As described below, the values that are received may specify one or more of the following for the network: resource devices, storage options, terminal server connectivity, software licenses, and other inputs. The input values may be in the form of numeric values (e.g., a number that specifies how many firewalls to include in the network, or a number that corresponds to whether a particular option is selected such as a "1" to include the option or a "0" to not include the option), character values (e.g., "YES" or "NO" to an input option choice), a character description that can be matched to a device type or model or other input decision, or a combination thereof.

A. Resource Devices

According to one embodiment, the plurality of values specifies resource devices, such as the number of firewalls, load balancers, servers, and storage devices to be included in the network. The values may specify the number of each type of resource device to be included (e.g., 10 firewalls and 5 load balancers), the number of a particular model of a device type (e.g., 15 Sun 420R 2×2 servers, 15 Sun 420R 4×4 servers, and 60 HP LPr NetServers), or a combination thereof.

According to another embodiment, the plurality of values specifies a characteristic of the network that is to be satisfied in the configuration, and the number and types of devices required to satisfy the characteristic is determined based on the value provided and one or more rules. For example, a user may provide a total storage capacity value for the network as 700 GB. As explained below, the number of storage devices required to provide that amount of storage capacity is determined based on a rule that specifies the amount of storage per storage device, for example, 75 GB/storage device.

B. Storage Options

In addition to specifying the storage devices or storage capacity as described above, additional input values may be provide for other storage options. For example, a backup storage option may specify whether all or some of the storage capacity should be backed up to additional storage devices, such as a tape library. As another example, the storage options may specify the capacity of each storage device (e.g., the 75 GB/storage device value in the example above), so that the user may specify both the total amount of storage capacity and what size storage devices are desired.

C. Terminal Server Connectivity

The input values may specify one or more terminal server connectivity options for the devices to be included in the network. For example, input values may specify whether terminal server connectivity is desired for each type of device, such as the control devices or the VLAN switches to be included in the network, or particular models of devices, such as SUN 420R servers or HP LPr NetServers. As another example, the input values may specify that only specifically identified devices are to have terminal connectivity, or a particular fraction or percentage of the devices of a particular type or model are to have terminal connectivity.

D. Software Licenses

Another type of input that may be included is the number of software licenses of various types for the devices in the network. For example, the input values may specify which operating system (OS) software is to be used for the resource devices. Specifically, OS software licenses may be available for Solaris, Windows 2000, and Linux, and the input values may specify how many licenses for each type of OS are desired for the network.

E. Other Inputs

While the inputs described above are focused on the broad characteristics of the network, any type of input may be received and used to determine the description of the configuration of the network. For example, any data or information that is used in generating the description of the configuration for the network may be provided as input including, but not limited to, characteristics and parameters for types of devices or particular models of devices such as power requirements, Ethernet ports available, and cost. As another example, the type of devices and the number of each type of device to be included in a rack configuration may be provided using input values.

After receiving the values that specify one or more types of input, an input check may be performed to ensure that the input values meet one or more predetermined criteria. For example, there may be a minimum number, a maximum number, or both a minimum and maximum number of devices of a particular type or model. If the input value does not satisfy the predetermined criteria, an error message may be provided or a prompt may be given to the user to provide a different input value. As an example, if the input values specify the software licenses for the resource devices, a check may be made to ensure that only one OS software license is requested for each resource device to be included in the network.

III. Determination of Network Equipment Requirements

A description of a configuration for a network that includes a plurality of devices is generated based upon the plurality of values provided as input, as described above. According to one embodiment, the description of the configuration for the network includes a description of the equipment requirements for the network, including a listing of the devices to be included in the network by device type, particular device models, or both. The types of equipment requirements may include, but are not limited to, the storage devices for the network, control devices, and equipment racks, which are determined as described below. In some embodiments, one or more configuration rack templates are used.

A. Storage Devices

The storage devices and other SAN equipment for the network are determined based on one or more of the following: the input values for the resource devices, the storage options, additional data, and one or more rules. For example, the input values may specify the number of disk arrays of a particular type to be included in the network (e.g., how many EMC Symmetrix 8430-73 GB storage devices to include in the network), so the determination of the primary storage devices for the network is based upon the input values without the use of any additional data.

The input values may specify one or more storage options, such as backup capacity. For example, if the input values specify that all the primary storage devices are to be backed-up using tape libraries, the number of backup tape devices may be determined based on the total capacity of the primary storage devices and the available capacity of each tape library.

In addition to determining the storage devices themselves to be included in the network, other SAN equipment may be determined. For example, when Brocade switches are used, the number of Brocade switches to be included may be determined based on stored data that specifies how many ports per Brocade switch can be used for data and the total number of data ports required in the network. The required number of data ports can include the data ports needed for the storage devices as determined for the network and additional ports for other equipment, such as to provide open zoning or for VLAN switches, such as Pathlight devices.

As a particular example, if the number of ports available for data per Brocade switch is twelve, the number of Brocade switches for the network may be determined as follows:

1) Determine the total number of storage array data ports based on the number of storage arrays for the network and the number of data ports per storage array. The total number of storage arrays is determined as discussed above.
2) Determine the total number of Pathlight ports based on the number of Pathlights for the network and the number of data ports per Pathlight. The total number of Pathlights may be determined based on a rule, such as that each Pathlight can support six provisionable equipment servers (e.g., Sun 420R or HP LPr NetServers).
3) Determine the total number of open zoning ports.
4) Sum the results of the three values above and divide by the number of data ports available per Brocade switch (e.g., 12) to determine the number of Brocade switches to be included in the network.

B. Control Devices

As discussed above, control devices can include several types of devices, including but not limited to, CPU's for network administrative and control functions, routers, switches, and terminal servers. The control devices for the network are determined based on one or more of the following: the input values for the resource devices, the storage options, additional data, and one or more rules. For example, one input value may specify whether the network is to have a highly available infrastructure. If so, then the network can be configured to include two infrastructure database (IDB) devices, and if not, then the network can be configured to include only one IDB.

As another example, stored data may indicate how many service processors and virtual LAN's (VLAN's) can be supported by each control device (e.g., each IDB). Based on the number of service processors and VLAN's to be included in the network, the number of IDB's can be determined. The input value regarding high network availability can be used to increase the number of IDB's (e.g., for high availability, double the number of IDB's that are otherwise required for the network, or increase the number of IDB's by a specified percentage).

The console requirements (e.g., the number of terminal servers) can be determined based on the resource devices, storage devices, and other control devices for the network. For example, if the input values specify the device types and models for which terminal server connectivity is to be included in the network, the number of terminal servers can be determined by summing up the required number of terminal server ports and dividing by the number of ports provided by each terminal server (e.g., 32).

The switching requirements for the network can be determined based on the number of required ports of each type and the capacity of the switching equipment. For example, a typical network may include both Gigabit and Fast Ethernet connections. The network infrastructure can include a particular switch configuration, such as the use of two core switches and two access switches, which can be specified via a rule. The particular types of switches for the network may be specified by stored data or a rule, such as that Cisco Catalyst 6513 switches are to be used.

For the particular switch or switches, the stored data may specify a base port configuration, such as that each switch has 16 Gigabit Ethernet ports and 96 Fast Ethernet ports. The stored data also may specify how many additional switches are provided by each additional blade, such as 16 Gigabit Ethernet ports per blade or 48 Fast Ethernet ports per blade.

As a result, the number of additional blades to be included on the switches can be determined as follows:
1) Sum the total number of ports required for each type of port by the resource devices, storage devices, and other control devices.
2) Subtract the number of ports of each port type provided by the switches specified in the network infrastructure based on each switch's base configuration.
3) Determine the number of additional blades required for each type of port by dividing the results from above for each port type by the number of ports of each type provided by each blade.

C. Equipment Racks

The number of equipment racks required for the network are determined based on one or more of the following: the input values for the resource devices, the storage options, additional stored data, and one or more rules. For example, each device to be included in the network may be associated with a "rack unit" value that reflects the amount of space in a rack that is occupied by each device. Based on the number of each type of resource device, storage device, and control device determined above, the total number of rack units required for all devices in the network can be determined. The total number of equipment racks is then calculated based on the total number of rack units required for the network divided by the number of rack units of space provided by each rack. The total number of racks may be rounded up to the next whole rack to determine how many racks are required for the network.

As another example, the approach above may be modified to reflect the fact that racks in reality are not packed with complete efficiency due to a number of factors, such as the actual sizes and orientations of the particular devices, cabling requirements, and device cooling requirements. As a result, each rack will contain empty space that is not used to hold network devices. Incomplete rack utilization can be accounted for in the above approach by decreasing the number of rack units provided by each rack or increasing the total number of rack units required for each device, thereby increasing the total number of racks determined for the network.

In addition to determining the number of racks to be included in the network based on the devices determined to be included in the network as described above, additional racks may be include for particular purposes. For example, the basic network infrastructure, or base configuration, may specify that every network include a core rack, such as for housing the core and access switches, a control rack, such as for housing the IDB's, a gateway/backup rack, and other miscellaneous racks, such as may be specified in the data or rules that describe the base configuration of the network. As a result, the network infrastructure may specify a minimum number of racks to be included for certain types of devices, and therefore only the number of racks for the remaining devices needs to be determined. The total number of racks for the network is then the sum of the racks required for the base configuration plus the number of racks as determined above for the resource devices, storage devices, and control devices to be included in the network.

D. Rack Configuration Templates

According to one embodiment, one or more rack configuration templates may be used to determine the number of equipment racks for the network. Each rack configuration template specifies a maximum number of devices for a group of device types. For example, a rack configuration template may specify that each rack hold no more than two firewalls, two load balancers, two Sun 420R servers, and 10 HP LPr NetServers. Such a configuration may be established to control the ratio of Sun servers to HP servers (e.g., an HP to Sun load out ratio of 5:1 in this example). The rack configuration can be tested to ensure that a rack with the maximum number of each type of device has acceptable power, cooling, and other performance characteristics. The rack configuration may be specified via one or more input values, stored data, one or more rules, or a combination thereof. According to one embodiment, one or more rack configuration templates may be used to determine the number of equipment racks for the network. Each rack configuration template specifies a maximum number of devices for a group of device types. For example, a rack configuration template may specify that each rack hold no more than two firewalls, two load balancers, two Sun 420R servers, and 10 HP LPr NetServers. Such a configuration may be established to control the ratio of Sun servers to HP servers (e.g., an HP to Sun load out ration of 5:1 in this example). The rack configuration can be tested to ensure that a rack with the maximum number of each type of device has acceptable power, cooling, and other performance characteristics. The rack configuration may be specified via one or more input values, stored data, one or more rules, or a combination thereof.

Once a rack configuration is established, the total number of devices for each device type or model is used with the rack configuration to determine how many equipment racks are required to hold the devices. In the example above, the rack template includes firewalls, load balancers, and servers, so the approach determines how many racks are needed to hold all the devices of each of those types. Assume, for example, that the input values specify that the network include six firewalls, six load balancers, ten Sun 420R 2×2 servers, ten Sun 420R 4×4 servers, and fifty HP LPr NetServers. The number of racks required for the network is determined as follows:
1) Determine how many racks are needed to hold all the firewalls for the network. In example above, there are six firewalls, and each rack can hold a maximum of two firewalls, so three racks are needed to hold the firewalls.
2) Determine how many racks are needed to hold all the load balancers. For this example, there are six load balancers and two load balancers are allowed in each rack, so again three racks are required.

3) Determine how many racks are needed to hold all the Sun servers. The example includes a total of twenty Sun servers, and each rack can accommodate two Sun servers, so ten racks are required.
4) Determine how many racks are needed to hold all the HP servers. The example includes fifty HP servers, with each rack holding up to ten, so five racks are required.
5) Determine the final number of racks for the network as the maximum of the number of racks determined above. In the example, three racks are needed for the firewalls and load balancers, ten are needed for the Sun servers, and five are needed for the HP servers, so the maximum number of racks is ten based on the Sun servers.

Therefore, in this example, the use of the rack configuration template results in determining that ten racks are required for the network. Note that in this example, there would be empty space in many racks because the first three racks would be able to house all the firewalls and load balancers and the first five racks would be able to house all the HP servers. Thus, the remaining five racks would house only two Sun servers per rack.

As explained above with reference to FIG. 1, input values may be modified or added, and the description of the configuration of the network automatically updated without requiring the input of any other input values. Therefore, in this example, the number of Sun servers could be decreased or the number of HP servers could be increased to more effectively utilize the racks for the network. As an alternative, the rack configuration template could be changed via input values to increase the number of Sun servers allowed per rack, and the number of racks re-determined based on the new input, to better utilize the capacity of the racks.

In some embodiments, the number of racks may be rounded down to the nearest whole rack instead of rounding up to the nearest whole rack (e.g., the last and less utilized rack is omitted). The equipment that is determined to go in the fractional or underutilized rack is instead placed in the available space of a fixed or specified rack in the base network configuration, such as a core rack, a control rack, or a gateway rack.

E. Description of Network Configuration

The description of the network configuration may have one of a variety of forms. For example, the description may be a table of equipment that is required for the network based on the resource devices, storage devices, control devices, equipment racks, and other equipment that may be determined as described above. The table may list how many devices are required by device type, device model, or a combination thereof.

As another example, the description of the network configuration may list the devices by equipment rack, showing how many devices of each device type or device model are to be included each equipment rack.

IV. Determination of Additional Network Parameters and Information

In addition to the description of the equipment requirements for the network as described above, the description of the configuration of the network may include additional information about the network. According to one embodiment, the description pf the configuration for the network includes one or more parameters or other information that describes or characterizes the network. For example, the description of the configuration of the network may include the network's power requirements, the network's floor space requirements, a bill of materials, or the cost of the network.

A. Power Requirements

The power requirements for the network are determined based on the number of devices of each device type and model and the power consumed by each individual device of each device type or model. In addition, a "loss factor" can be included in the determination of the power requirements to reflect heat losses from the equipment and cabling. For example, the loss factor may be 10%, meaning that 10% of the power supplied to the network is lost as waste heat, or the loss factor may be expressed as 0.9, meaning that the equipment and cabling uses nine tenths, or 90%, of the power supplied, and the remainder is lost. Therefore, the power requirements are increased to account for such losses, such as by adding an additional 10% of the total as calculated before taking into account the power losses.

B. Floor Space Requirements

The floor space requirements for the network are determined based on the number of racks and the floor space required or allocated for each rack. For example, each rack may be allocated twenty square feet, which reflects both the size of the rack (e.g., each rack's footprint on the floor) plus additional space around the rack to allow personnel to access the front and back of the rack.

C. Bill of Materials

In addition to generating a listing of the equipment required for the network as part of the description of the configuration of the network, a bill of materials (BOM) can be included. The BOM can list detailed information about each type of device and device model. For example, the BOM may list the device description, make, model, the device's role in the network, and additional notes or comments as may be desired.

The device description can include subunits, components, or additional add-on components for the device. For example, if the device is a Cisco Catalyst 6513 switch, the BOM can list the number of additional blades to provide the necessary number of Gigabit Ethernet ports for the network and the number of additional blades to provide the necessary number of Fast Ethernet ports for the network.

D. Cost

The cost for the network is determined based on the number of devices of each device type and model and the price for each individual device of each device type or model. The cost data may be stored along with other data that describes the parameters for each type of device or model.

E. Other Parameters

In addition to the parameters and information described above, additional parameters may be determined for the network. For example, based on the power requirements for the network and the floor space requirements, a power density value may be determined by dividing the power required by the floor space required to calculate the power per square foot for the network. Such a value may be useful to planners when designing the network because some areas for housing networks are rated based on the power density. If the power density for a particular network configuration is unacceptable, the inputs for the space required per rack can be adjusted and the resulting description of the configuration of the network modified to reflect the revised value. Alternatively, the input values can include a desired power density and the description of the configuration for the network can determine how much floor space should be allocated per rack.

V. Implementation Mechanisms

The approach for generating a description of a configuration for a virtual network system described herein may be implemented in a variety of ways and the invention is not limited to any particular implementation. The approach may be integrated into a computing system or a network device, or may be implemented as a stand-alone mechanism. Furthermore, the approach may be implemented in computer software, hardware, or a combination thereof.

Figure 4:
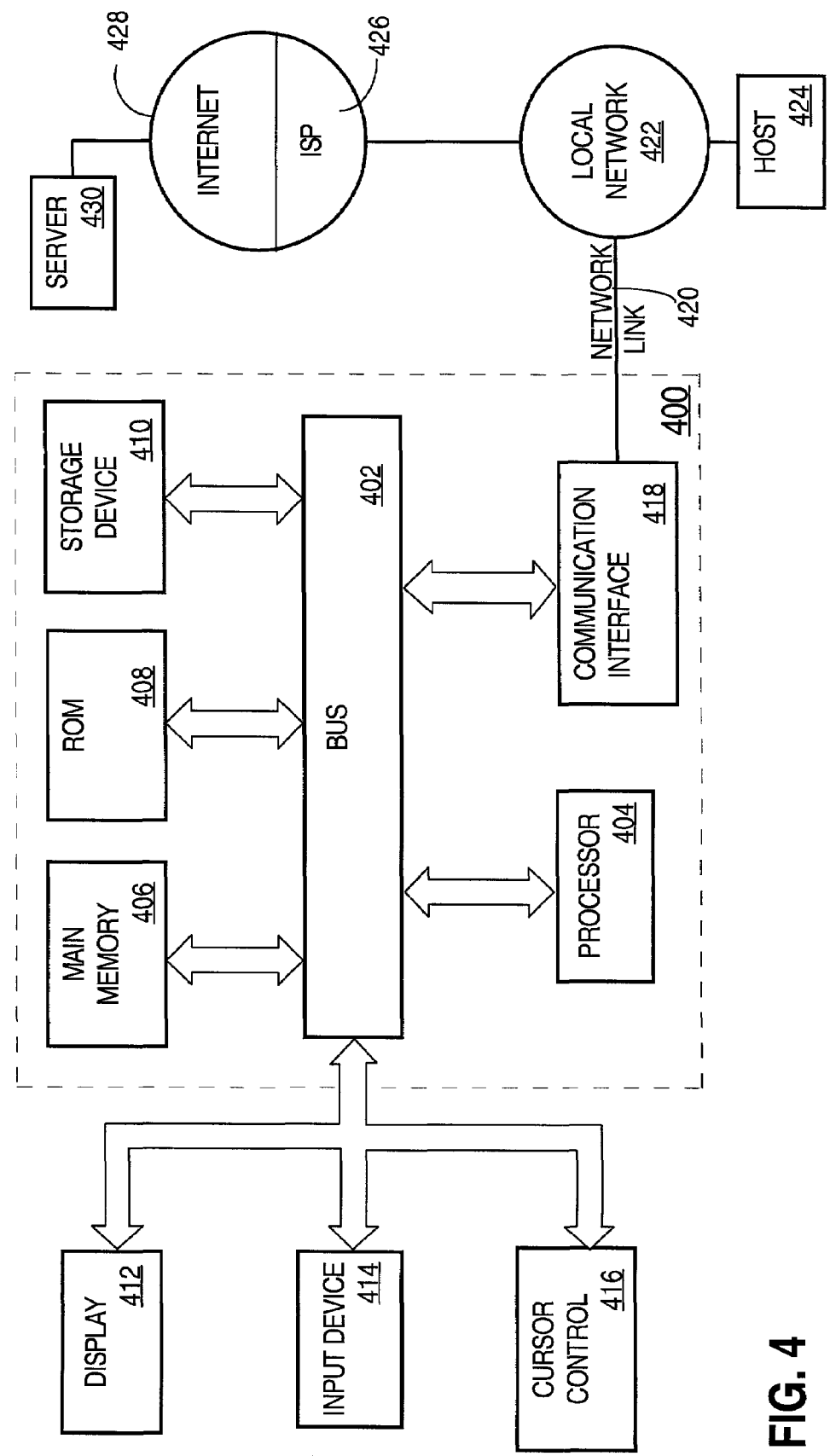
FIG. 4 is a block diagram that depicts a computer system upon which embodiments may be implemented.

FIG. 4 is a block diagram that depicts a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

VI. Extensions and Alternatives

In the foregoing specification, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for generating descriptions of configurations for virtual server farms within a computing grid, the method comprising the computer-implemented steps of:
    receiving a first plurality of values that specifies a first plurality of resource devices to be included in a first virtual server farm within the computing grid;
    in response to receiving the first plurality of values, determining a first plurality of devices to be included in the first virtual server farm, based on a set of data and one or more rules, wherein:
        the set of data includes information about one or more characteristics of each type of device in the first plurality of devices;
        the first plurality of devices includes the first plurality of resource devices and a first device for controlling the first virtual server farm;
        the first plurality of values includes a first option for storage to be included in the first virtual server farm, and
        the first plurality of devices includes a first plurality of storage devices;
    determining the first plurality of storage devices for the first virtual server farm, based on the first plurality of values that includes the first option for storage, the set of data, and the one or more rules;
    based on the first plurality of devices, generating a first description of a first configuration for the first virtual server farm;
    receiving a first additional value that changes one or more of the first plurality of values;
    in response to receiving the first additional value, modifying the first plurality of devices to be included in the first virtual server farm, based on the first additional value, the set of data, and the one or more rules;
    based on the modified first plurality of devices, generating a modified first description of the first configuration for the first virtual server farm;
    receiving a second plurality of values that specifies a second plurality of resource devices to be included in a second virtual server farm within the computing grid;
    in response to receiving the second plurality of values, determining a second plurality of devices to be included in the second virtual server farm, based on the set of data and the one or more rules, wherein:
        the set of data includes information about one or more characteristics of each type of device in the second plurality of devices;
        the second plurality of devices includes the second plurality of resource devices and a second device for controlling the second virtual server farm;
        the second plurality of values includes a second option for storage to be included in the second virtual server farm; and
        the second plurality of devices includes a second plurality of storage devices;
    determining the second plurality of storage devices for the second virtual server farm, based on the second plurality of values that includes the second option for storage, the set of data, and the one or more rules;
    based on the second plurality of devices, generating a second description of a second configuration for the second virtual server farm;
    receiving a second additional value that changes one or more of the second plurality of values;
    in response to receiving the second additional value, modifying the second plurality of devices to be included in the second virtual server farm, based on the second additional value, the set of data, and the one or more rules; and
    based on the modified second plurality of devices, generating a modified second description of the second configuration for the second virtual server farm.

2. A method as recited in claim 1, wherein:
    the steps of determining the first and second pluralities of devices to be included in the first and second virtual server farms includes, respectively, the steps of determining the first and second pluralities of devices to be included in the first and second virtual server farms without using one or more predetermined descriptions of possible pluralities of devices to be included in the first and second virtual server farms; and
    the steps of modifying the first and second pluralities of devices to be included in the first and second virtual server farms includes, respectively, the steps of automatically modifying the first and second pluralities of devices to be included in the first and second virtual server farms without requiring additional input.

3. A method as recited in claim 1, wherein:
    the step of receiving the first plurality of values that specifies the first plurality of resource devices includes the step of receiving the first plurality of values for the first virtual server farm that specifies a first plurality of servers, a first firewall, and a first load balancer; and
    the step of receiving the second plurality of values that specifies the second plurality of resource devices includes the step of receiving the second plurality of values for the second virtual server farm that specifies a second plurality of servers, a second firewall, and a second load balancer;
    the step of determining the first plurality of devices to be included in the first virtual server farms includes the step of determining a first plurality of control layer devices that includes the first device for controlling the first virtual server farm; and the step of determining the second plurality of devices to be included in the second virtual server farms includes the step of determining a second plurality of control layer devices that includes the second device for controlling the second virtual server farm.

4. A method as recited in claim 1, wherein:

the step of receiving the first plurality of values that specifies the first plurality of resource devices includes the step of receiving the first plurality of values that specifies the first plurality of resource devices and a first option for terminal server connectivity for the first plurality of devices;

the step of receiving the second plurality of values that specifies the second plurality of resource devices includes the step of receiving the second plurality of values that specifies the second plurality of resource devices and a second option for terminal server connectivity for the second plurality of devices;

the step of determining the first plurality of devices to be included in the first virtual server farm includes the step of determining a first plurality of control layer devices that includes the first device for controlling the first virtual server farm, a first terminal server, and a first set of switching equipment; and the step of determining the second plurality of devices to be included in the second virtual server farm includes the step of determining a second plurality of control layer devices that includes the second device for controlling the second virtual server farm, a second terminal server, and a second set of switching equipment.

5. A method as recited in claim 1, wherein:

the step of generating the first description of the first configuration for the first virtual server farm includes the step of generating a first estimate of a first set of equipment to be included in the first virtual server farm; and the step of generating the second description of the second configuration for the second virtual server farm includes the step of generating a second estimate of a second set of equipment to be included in the second virtual server farm.

6. A method as recited in claim 5, wherein:

the step of generating the first estimate of the first set of equipment for the first virtual server farm includes the step of generating a first bill of materials for the first virtual server farm; and the step of generating the second estimate of the second set of equipment for the second virtual server farm includes the step of generating a second bill of materials for the second virtual server farm.

7. A method as recited in claim 1, wherein:

the set of data includes an individual storage capacity for a storage device;

the first option for storage to be included in the first virtual server farm specifies a first storage capacity for the first virtual server farm;

determining the first plurality of storage devices for the first virtual server farm includes determining a first number of storage devices by dividing the first storage capacity by the individual storage capacity;

the second option for storage to be included in the second virtual server farm specifies a second storage capacity for the second virtual server farm; and determining the second plurality of storage devices for the second virtual server farm includes determining a second number of storage devices by dividing the second storage capacity by the individual storage capacity.

8. A method as recited in claim 1, the method further comprising the computer-implemented steps of:

retrieving data that specifies a configuration of an equipment rack;

based on the data and the first plurality of devices, determining a first number of equipment racks for the first virtual storage farm; and based on the data and the second plurality of devices, determining a second number of equipment racks for the second virtual storage farm.

9. A method as recited in claim 8, wherein the data specifies that the equipment rack includes a first number of a first device and a second number of a second device, and the method further comprises the computer-implemented steps of:

based on the first plurality of devices, determining a third number of the first device and a fourth number of the second device that are to be included in the first virtual server farm;

based on the data and the third number of the first device and the fourth number of the second device that are to be included in the first virtual server farm, determining the first number of equipment racks for the first virtual server farm by:
  determining a fifth number of equipment racks by dividing the third number by the first number;
  determining a sixth number of equipment racks by dividing the fourth number by the second number; and
  setting the first number of equipment racks equal to the maximum of the fifth number and the sixth number;

based on the second plurality of devices, determining a seventh number of the first device and an eighth number of the second device that are to be included in the second virtual server farm;

based on the data and the seventh number of the first device and the eighth number of the second device that are to be included in the second virtual server farm, determining the second number of equipment racks for the second virtual server farm by:
  determining a ninth number of equipment racks by dividing the seventh number by the first number;
  determining a tenth number of equipment racks by dividing the eighth number by the second number; and
  setting the second number of equipment racks equal to the maximum of the ninth number and the tenth number.

10. A method as recited in claim 1, the method further comprising the computer-implemented steps of:

based on the first plurality of devices, generating a first estimate of a first parameter for the first virtual server farm selected from a first group consisting of a first amount of power required for the first virtual server farm, a first number of equipment racks required for the first virtual server farm, a first amount of floor space required for the first virtual server farm, and a first cost for the first virtual server farm; and based on the second plurality of devices, generating a second estimate of a second parameter for the second virtual server farm selected from a second group consisting of a second amount of power required for the second virtual server farm, a second number of equipment racks required for the second virtual server farm, a second amount of floor space required for the second virtual server farm, and a second cost for the second virtual server farm.

11. A method as recited in claim 1, wherein:

the step of receiving the first plurality of values includes the step of receiving the first plurality of values that specifies the first plurality of resource devices and a first number of licenses for one or more types of operating systems;

the method further comprises the computer-implemented steps of:

determining whether a first number of resource devices that are included in the first plurality of resource devices is less than the first number of licenses for the one or more types of operating systems; and generating a first error message when the first number of resource devices is greater than the first number of licenses; and the step of receiving the second plurality of values includes the step of receiving the second plurality of values that specifies the second plurality of resource devices and a second number of licenses for the one or more types of operating systems;

the method further comprises the computer-implemented steps of:

determining whether a second number of resource devices that are included in the second plurality of resource devices is less than the second number of licenses for the one or more types of operating systems; and generating a second error message when the second number of resource devices is greater than the second number of licenses.

12. A method as recited in claim 1, further comprising:

based on the first plurality of storage devices, the set of data, and the one or more rules, determining a first number of storage area network switches for the first virtual server farm; and based on the second plurality of storage devices, the set of data, and the one or more rules, determining a second number of storage area network switches for the second virtual server farm.

13. A computer-readable medium carrying one or more sequences of instructions for generating descriptions of configurations for a virtual server farms within a computing grid that includes a plurality of devices, which instructions, when executed by one or more processors, cause the one or more processors to carry out the steps of:

receiving a first plurality of values that specifies a first plurality of resource devices to be included in a first virtual server farm within the computing grid;

in response to receiving the first plurality of values, determining a first plurality of devices to be included in the first virtual server farm, based on a set of data and one or more rules, wherein:

the set of data includes information about one or more characteristics of each type of device in the first plurality of devices;

the first plurality of devices includes the first plurality of resource devices and a first device for controlling the first virtual server farm;

the first plurality of values includes a first option for storage to be included in the first virtual server farm, and the first plurality of devices includes a first plurality of storage devices:

determining the first plurality of storage devices for the first virtual server farm, based on the first plurality of values that includes the first option for storage, the set of data, and the one or more rules;

based on the first plurality of devices, generating a first description of a first configuration for the first virtual server farm;

receiving a first additional value that changes one or more of the first plurality of values;

in response to receiving the first additional value, modifying the first plurality of devices to be included in the first virtual server farm, based on the first additional value, the set of data, and the one or more rules;

based on the modified first plurality of devices, generating a modified first description of the first configuration for the first virtual server farm;

receiving a second plurality of values that specifies a second plurality of resource devices to be included in a second virtual server farm within the computing grid;

in response to receiving the second plurality of values, determining a second plurality of devices to be included in the second virtual server farm, based on the set of data and the one or more rules, wherein:

the set of data includes information about one or more characteristics of each type of device in the second plurality of devices;

the second plurality of devices includes the second plurality of resource devices and a second device for controlling the second virtual server farm;

the second plurality of values includes a second option for storage to be included in the second virtual server farm; and the second plurality of devices includes a second plurality of storage devices;

determining the second plurality of storage devices for the second virtual server farm, based on the second plurality of values that includes the second option for storage, the set of data, and the one or more rules;

based on the second plurality of devices, generating a second description of a second configuration for the second virtual server farm;

receiving a second additional value that changes one or more of the second plurality of values;

in response to receiving the second additional value, modifying the second plurality of devices to be included in the second virtual server farm, based on the second additional value, the set of data, and the one or more rules; and based on the modified second plurality of devices, generating a modified second description of the second configuration for the second virtual server farm.

14. An apparatus generating descriptions of configurations for a virtual server farms within a computing grid, comprising:

means for receiving a first plurality of values that specifies a first plurality of resource devices to be included in a first virtual server farm within the computing grid;

means for determining, in response to receiving the first plurality of values, a first plurality of devices to be included in the first virtual server farm, based on a set of data and one or more rules, wherein:

the set of data includes information about one or more characteristics of each type of device in the first plurality of devices;

the first plurality of devices includes the first plurality of resource devices and a first device for controlling the first virtual server farm;

the first plurality of values includes a first option for storage to be included in the first virtual server farm, and the first plurality of devices includes a first plurality of storage devices;

means for determining the first plurality of storage devices for the first virtual server farm, based on the first plurality of values that includes the first option for storage, the set of data, and the one or more rules;

means for generating, based on the first plurality of devices, a first description of a first configuration for the first virtual server farm;

means for receiving a first additional value that changes one or more of the first plurality of values;

means for modifying, in response to receiving the first additional value, the first plurality of devices to be included in the first virtual server farm, based on the first additional value, the set of data, and the one or more rules;

means for generating a modified first description of the first configuration for the first virtual server farm, based on the modified first plurality of devices means for receiving a second plurality of values that specifies a second plurality of resource devices to be included in a second virtual server farm within the computing grid;

means for determining, in response to receiving the second plurality of values, a second plurality of devices to be included in the second virtual server farm, based on the set of data and the one or more rules, wherein:

the set of data includes information about one or more characteristics of each type of device in the second plurality of devices;

the second plurality of devices includes the second plurality of resource devices and a second device for controlling the second virtual server farm;

the second plurality of values includes a second option for storage to be included in the second virtual server farm; and the second plurality of devices includes a second plurality of storage devices;

means for determining the second plurality of storage devices for the second virtual server farm, based on the second plurality of values that includes the second option for storage, the set of data, and the one or more rules;

means for generating, based on the second plurality of devices, a second description of a second configuration for the second virtual server farm;

means for receiving a second additional value that changes one or more of the second plurality of values;

means for modifying, in response to receiving the second additional value, the second plurality of devices to be included in the second virtual server farm, based on the second additional value, the set of data, and the one or more rules; and means for generating, based on the modified second plurality of devices, a modified second description of the second configuration for the second virtual server farm.

15. An apparatus for generating descriptions of configurations for virtual server farms within a computing grid, comprising:

a processor;

one or more stored sequences of instructions which, when executed by the processor, cause the processor to carry out the steps of:

receiving a first plurality of values that specifies a first plurality of resource devices to be included in a first virtual server farm within the computing grid;

in response to receiving the first plurality of values, determining a first plurality of devices to be included in the first virtual server farm, based on a set of data and one or more rules, wherein:

the set of data includes information about one or more characteristics of each type of device in the first plurality of devices;

the first plurality of devices includes the first plurality of resource devices and a first device for controlling the first virtual server farm;

the first plurality of values includes a first option for storage to be included in the first virtual server farm, and the first plurality of devices includes a first plurality of storage devices;

determining the first plurality of storage devices for the first virtual server farm, based on the first plurality of values that includes the first option for storage, the set of data, and the one or more rules;

based on the first plurality of devices, generating a first description of a first configuration for the first virtual server farm;

receiving a first additional value that changes one or more of the first plurality of values;

in response to receiving the first additional value, modifying the first plurality of devices to be included in the first virtual server farm, based on the first additional value, the set of data, and the one or more rules;

based on the modified first plurality of devices, generating a modified first description of the first configuration for the first virtual server farm;

receiving a second plurality of values that specifies a second plurality of resource devices to be included in a second virtual server farm within the computing grid;

in response to receiving the second plurality of values, determining a second plurality of devices to be included in the second virtual server farm, based on the set of data and the one or more rules, wherein:

the set of data includes information about one or more characteristics of each type of device in the second plurality of devices;

the second plurality of devices includes the second plurality of resource devices and a second device for controlling the second virtual server farm;

the second plurality of values includes a second option for storage to be included in the second virtual server farm; and the second plurality of devices includes a second plurality of storage devices;

determining the second plurality of storage devices for the second virtual server farm, based on the second plurality of values that includes the second option for storage, the set of data, and the one or more rules;

based on the second plurality of devices, generating a second description of a second configuration for the second virtual server farm;

receiving a second additional value that changes one or more of the second plurality of values;

in response to receiving the second additional value, modifying the second plurality of devices to be included in the second virtual server farm, based on the second additional value, the set of data, and the one or more rules; and based on the modified second plurality of devices, generating a modified second description of the second configuration for the second virtual server farm.

16. A computer-readable medium as recited in claim 13, wherein:

the steps of determining the first and second pluralities of devices to be included in the first and second virtual server farms includes, respectively, the steps of determining the first and second pluralities of devices to be included in the first and second virtual server farms without using one or more predetermined descriptions of possible pluralities of devices to be included in the first and second virtual server farms; and the steps of modifying the first and second pluralities of devices to be included in the first and second virtual server farms includes, respectively, the steps of automatically modifying the first and second pluralities of devices to be included in the first and second virtual server farms without requiring additional input.

17. A computer-readable medium as recited in claim 13, wherein:

the step of receiving the first plurality of values that specifies the first plurality of resource devices includes the step of receiving the first plurality of values for the first virtual server farm that specifies a first plurality of servers, a first firewall, and a first load balancer; and the step of receiving the second plurality of values that specifies the second plurality of resource devices includes the step of receiving the second plurality of values for the second virtual server farm that specifies a second plurality of servers, a second firewall, and a second load balancer;

the step of determining the first plurality of devices to be included in the first virtual server farms includes the step of determining a first plurality of control layer devices that includes the first device for controlling the first virtual server farm; and the step of determining the second plurality of devices to be included in the second virtual server farms includes the step of determining a second plurality of control layer devices that includes the second device for controlling the second virtual server farm.

18. A computer-readable medium as recited in claim 13, wherein:

the step of receiving the first plurality of values that specifies the first plurality of resource devices includes the step of receiving the first plurality of values that specifies the first plurality of resource devices and a first option for terminal server connectivity for the first plurality of devices;

the step of receiving the second plurality of values that specifies the second plurality of resource devices includes the step of receiving the second plurality of values that specifies the second plurality of resource devices and a second option for terminal server connectivity for the second plurality of devices;

the step of determining the first plurality of devices to be included in the first virtual server farm includes the step of determining a first plurality of control layer devices that includes the first device for controlling the first virtual server farm, a first terminal server, and a first set of switching equipment; and the step of determining the second plurality of devices to be included in the second virtual server farm includes the step of determining a second plurality of control layer devices that includes the second device for controlling the second virtual server farm, a second terminal server, and a second set of switching equipment.

19. A computer-readable medium as recited in claim 13, wherein:

the step of generating the first description of the first configuration for the first virtual server farm includes the step of generating a first estimate of a first set of equipment to be included in the first virtual server farm; and the step of generating the second description of the second configuration for the second virtual server farm includes the step of generating a second estimate of a second set of equipment to be included in the second virtual server farm.

20. A computer-readable medium as recited in claim 19, wherein:

the step of generating the first estimate of the first set of equipment for the first virtual server farm includes the step of generating a first bill of materials for the first virtual server farm; and the step of generating the second estimate of the second set of equipment for the second virtual server farm includes the step of generating a second bill of materials for the second virtual server farm.

21. A computer-readable medium as recited in claim 13, wherein:

the set of data includes an individual storage capacity for a storage device;

the first option for storage to be included in the first virtual server farm specifies a first storage capacity for the first virtual server farm;

determining the first plurality of storage devices for the first virtual server farm includes determining a first number of storage devices by dividing the first storage capacity by the individual storage capacity;

the second option for storage to be included in the second virtual server farm specifies a second storage capacity for the second virtual server farm; and determining the second plurality of storage devices for the second virtual server farm includes determining a second number of storage devices by dividing the second storage capacity by the individual storage capacity.

22. A computer-readable medium as recited in claim 13, the computer-readable medium further comprises one or more sequences of instructions which, when executed by one or more processors, cause the one or more processors to carry out the steps of:

retrieving data that specifies a configuration of an equipment rack;

based on the data and the first plurality of devices, determining a first number of equipment racks for the first virtual storage farm; and based on the data and the second plurality of devices, determining a second number of equipment racks for the second virtual storage farm.

23. A computer-readable medium as recited in claim 22, wherein the data specifies that the equipment rack includes a first number of a first device and a second number of a second device, and the computer-readable medium further comprises the computer-implemented steps of:

based on the first plurality of devices, determining a third number of the first device and a fourth number of the second device that are to be included in the first virtual server farm;

based on the data and the third number of the first device and the fourth number of the second device that are to be included in the first virtual server farm, determining the first number of equipment racks for the first virtual server farm by:
  determining a fifth number of equipment racks by dividing the third number by the first number;
  determining a sixth number of equipment racks by dividing the fourth number by the second number; and
  setting the first number of equipment racks equal to the maximum of the fifth number and the sixth number;

based on the second plurality of devices, determining a seventh number of the first device and an eighth number of the second device that are to be included in the second virtual server farm;

based on the data and the seventh number of the first device and the eighth number of the second device that are to be included in the second virtual server farm, determining the second number of equipment racks for the second virtual server farm by:
  determining a ninth number of equipment racks by dividing the seventh number by the first number;
  determining a tenth number of equipment racks by dividing the eighth number by the second number; and
  setting the second number of equipment racks equal to the maximum of the ninth number and the tenth number.

24. A computer-readable medium as recited in claim 13, the computer-readable medium further comprises one or more sequences of instructions which, when executed by one or more processors, cause the one or more processors to carry out the steps of:
  based on the first plurality of devices, generating a first estimate of a first parameter for the first virtual server farm selected from a first group consisting of a first amount of power required for the first virtual server farm, a first number of equipment racks required for the first virtual server farm, a first amount of floor space required for the first virtual server farm, and a first cost for the first virtual server farm; and
  based on the second plurality of devices, generating a second estimate of a second parameter for the second virtual server farm selected from a second group consisting of a second amount of power required for the second virtual server farm, a second number of equipment racks required for the second virtual server farm, a second amount of floor space required for the second virtual server farm, and a second cost for the second virtual server farm.

25. A computer-readable medium as recited in claim 13, wherein:
  the step of receiving the first plurality of values includes the step of receiving the first plurality of values that specifies the first plurality of resource devices and a first number of licenses for one or more types of operating systems;
  the computer-readable medium further comprises one or more sequences of instructions which, when executed by one or more processors, cause the one or more processors to carry out the steps of:
    determining whether a first number of resource devices that are included in the first plurality of resource devices is less than the first number of licenses for the one or more types of operating systems; and
    generating a first error message when the first number of resource devices is greater than the first number of licenses; and
  the step of receiving the second plurality of values includes the step of receiving the second plurality of values that specifies the second plurality of resource devices and a second number of licenses for the one or more types of operating systems;
  the computer-readable medium further comprises one or more sequences of instructions which, when executed by one or more processors, cause the one or more processors to carry out the steps of:
    determining whether a second number of resource devices that are included in the second plurality of resource devices is less than the second number of licenses for the one or more types of operating systems; and
    generating a second error message when the second number of resource devices is greater than the second number of licenses.

26. A computer-readable medium as recited in claim 13, further comprising one or more sequences of instructions which, when executed by one or more processors, cause the one or more processors to carry out the steps of:
  based on the first plurality of storage devices, the set of data, and the one or more rules, determining a first number of storage area network switches for the first virtual server farm; and
  based on the second plurality of storage devices, the set of data, and the one or more rules, determining a second number of storage area network switches for the second virtual server farm.

* * * * *